United States Patent [19]

Shibata

[11] Patent Number: 5,799,441
[45] Date of Patent: Sep. 1, 1998

[54] WINDOW REGULATOR

[75] Inventor: Kazuma Shibata, Kosai, Japan

[73] Assignee: Asmo Co., Ltd., Japan

[21] Appl. No.: 670,071

[22] Filed: Jun. 25, 1996

[30] Foreign Application Priority Data

Jun. 30, 1995 [JP] Japan .................... 7-165738
May 9, 1996 [JP] Japan .................... 8-115113

[51] Int. Cl.$^6$ .................................... E05F 11/48
[52] U.S. Cl. .................................................. 49/352
[58] Field of Search .................. 49/348, 349, 352; 474/91

[56] References Cited

U.S. PATENT DOCUMENTS

| | | | |
|---|---|---|---|
| 2,134,490 | 10/1938 | Shartle | 474/91 |
| 4,944,714 | 7/1990 | Storck | 474/91 |
| 5,076,014 | 12/1991 | Cuyl | 49/352 X |
| 5,309,678 | 5/1994 | Adachi | 49/352 |
| 5,505,022 | 4/1996 | Shibata et al. | 49/352 |

FOREIGN PATENT DOCUMENTS 4-116579 10/1992 Japan .
5-24641 3/1993 Japan .

*Primary Examiner*—Jerry Redman

[57] ABSTRACT

A window regulator so constructed as not to be deteriorated in slidability between a band member and a guide surface is disclosed. An end of the band member formed annularly by a slider is guided by a guide member so that the inner side surface of the band member slides along the guide surface. The guide surface includes lateral grooves, brushes and a recess. The lateral grooves always retain grease and supply an appropriate amount of it to the inner side surface of the band member by the sliding motion of the latter. The brushes remove dust and dirt which may attach to the inner side surface of the band member by the sliding motion thereof. The recess keeps off the dust and dirt attached on the periphery of engaging holes of the band member from the space between the guide surface and the inner side surface of the band member. The slidability between the band member and the guide surface thus is not deteriorated and the band member can smoothly slide along the guide surface.

23 Claims, 17 Drawing Sheets

WINDOW REGULATOR

BACKGROUND OF THE INVENTION

1. Field of the Invention

The present invention relates to a window regulator for opening and closing the window glass of an automotive vehicle.

2. Description of the Related Art

A conventional window regulator for opening and closing the window glass of an automotive vehicle is a window regulator 150 as shown in FIGS. 27 and 28, in which a band member 152 connected with a window glass not shown is rotated manually or by motor for moving up and down the window glass.

The band member 152 has an end or both ends thereof normally wound on a guide member 154. The guide member 154 is shaped as a semicircular cylinder, with an arcuate side thereof designated as a guide surface 156 in contact with an inner side surface 152A of the band member 152. With the revolution of the band member 152, therefore, the inner side surface 152A of the band member 152 slides on the guide surface 156.

The band member 152 is normally coated with grease on the inner side surface 152A thereof, whereby the band member 152 is adapted to slide smoothly on the guide member surface 156.

The grease coated on the inner side surface 152A of the band member 152, however, sometimes develops irregularities so that the slidability with the guide surface 156 is deteriorated at the portions small in the amount of the grease or totally lacking the grease.

Also, dust or dirt which may attach to the inner side surface 152A of the band member 152 intrudes between the inner side surface 152A of the band member 152 and the guide surface 156 thereby to deteriorate the slidability.

Especially in the case where a sprocket is arranged at an end of the band member 152 to rotate the band member 152, dust or dirt staying in a plurality of engaging holes 158 formed along the length of the band member 152 and adapted to be in mesh with the sprocket teeth intrudes between the inner side surface 152A of the band member 152 and the guide surface 156 thereby to further deteriorate the slidability.

SUMMARY OF THE INVENTION

The object of the present invention is to provide a window regulator which is so constructed as not to deteriorate the slidability between the band member and the guide surface taking the above-mentioned facts into consideration.

According to a first aspect of the invention, there is provided a window regulator comprising an annular band member rotated for opening and closing the window glass, a guide member wound with the band member, and a guide surface formed arcuate on the guide member for guiding the band member in contact therewith, wherein a plurality of lateral grooves are formed in the guide surface extending along the direction crossing to the direction in which the band member slides.

The annular band member wound on the guide member rotates thereby to move the window glass up and down. This guide member is formed with an arcuate guide surface, in contact with which the band member is rotated. As a result, the band member can be wound on the guide member with a simpler construction and a lower cost than the conventionally-used pulley or the like.

Grease is customarily coated on the inner side surface of the band member in order to smooth the motion of the band member. The lateral grooves formed in the guide surface of the guide member functions as what is called a grease stay which always retains a predetermined amount of grease and supplies an appropriate amount of it to the inner side surface of the band member with the sliding motion between the band member and the guide surface as the band member rotates. For this reason, the band member is prevented from being in short supply of grease and thus can slide smoothly on the guide surface of the guide member.

According to a second aspect of the invention, there is provided a window regulator wherein the junction between the ends along the width of the lateral grooves and the guide surface is formed as a rectangular-shaped corner.

The rectangular-shaped corner of the junction between the ends along the width of the lateral grooves and the guide surface scrapes off any dust or dirt which may attach to the inner side surface of the band member when the band member slides on the guide surface of the guide member, thereby preventing the slidability from being deteriorated.

According to a third aspect of the invention, there is provided a window regulator wherein a plurality of engaging holes are formed contiguously in the band member along the longitudinal direction thereof, and a recess having a width larger than that of the engaging holes is formed at the portion of the guide surface opposed to the engaging holes along the direction in which the band member slides.

The recess formed along the sliding direction of the band member in the guide surface of the guide member has a width larger than that of the engaging hole formed in the band member. In other words, the band member is in contact with the guide surface only at the ends along the width thereof not formed with any engaging hole. As a consequence, even when dust or dirt attached to the band member may stay in the engaging holes, they do not attach to the guide surface and therefore do not adversely affect the slidability.

According to a fourth aspect of the invention, there is provided a window regulator comprising an annular band member rotated for opening and closing the window glass, a guide member wound with the band member, and a guide surface formed arcuate in the guide member for guiding the band member in contact therewith, wherein a plurality of longitudinal grooves are formed in the guide surface extending along the direction in which the band member slides.

The longitudinal grooves formed in the guide surface along the direction which the band member slides functions as a grease stay. In other words, a certain amount of grease always stays in the longitudinal grooves so that an appropriate amount of grease is supplied to the inner side surface of the band member by the sliding motion of the band member. Also, the longitudinal grooves can remove and retain the dust or dirt attached to the inner side surface of the band member.

Further, the portion of the guide surface formed with the longitudinal grooves is out of contact with the band member, resulting in a smaller contact area between the guide surface and the band member. Consequently, even when dust or dirt attach to the inner side surface of the band member, the effect thereof is minimized to assure a smooth sliding motion of the band member.

According to a fifth aspect of the invention, there is provided a window regulator comprising an annular band member rotated for opening and closing the window glass, a guide member wound with the band member, and a guide surface formed arcuate in the guide member for guiding the band member in contact therewith, wherein rollers are rotatably arranged on the guide surface along the direction in which the band member slides.

The band member is in contact with and guided by the rotation of the rotatable rollers installed on the guide surface along the direction in which the band member slides. The band member, which is not rubbed in direct contact with the guide surface, is thus guided smoothly.

According to a sixth aspect of the invention, there is provided a window regulator comprising recesses formed in the guide surface for accommodating the rollers embedded therein, wherein an inner groove is formed in the inner side of each of the recesses.

The rollers are accommodated in the recesses formed in the guide surface, and the inner groove is formed in the inner side of each of the recesses. This inner groove functions as a grease stay so that an appropriate amount of grease is kept supplied to the roller surface. As a consequence, the band member is also supplied with an appropriate amount of grease thereby to guide the band member smoothly.

According to a seventh aspect of the invention, there is provided a window regulator comprising an annular band member rotated for opening and closing the window glass, a guide member wound with the band member, and a guide surface formed arcuate on the guide member for guiding the band member in contact therewith, wherein a plurality of spherical protrusions are formed on the guide surface along the direction in which the band member slides.

The band member is adapted to slide while being kept in contact with the protrusions formed on the guide surface. The plural protrusions formed along the direction in which the band member slides leaves a rectilinear trace as the band member slides thereon, and hence the contact area of the band member is reduced. The effect of the dust or dirt which may attach to the inner side surface of the band member is thus minimized to assure a smooth sliding motion of the band member. Also, the spherical shape of the protrusions prevents the band member in the process of sliding motion from being caught by the protrusions.

According to an eighth aspect of the invention, there is provided a window regulator comprising an annular band member rotated for opening and closing the window glass, a guide member wound with the band member, and a guide surface formed arcuate on the guide member for guiding the band member in contact therewith, wherein the guide surface is unevenly corrugated along the direction in which the band member slides.

The band member, which is kept in contact with the protruded portions (crests) but kept out of the contact with the bottoms (troughs) of the guide surface formed in corrugation, is reduced in contact area. As a result, the dust or dirt attached on the inner side surface of the band member has a lesser effect, thereby assuring a smooth sliding motion of the band member. Also, the troughs of the guide surface act as a grease stay to supply an appropriate amount of grease to the inner side surface of the band member.

According to a ninth aspect of the invention, there is provided a window regulator comprising an annular band member rotated for opening and closing the window glass, a guide member wound with the band member, and a guide surface formed arcuate on the guide member for guiding the band member in contact therewith, wherein a plurality of recesses are formed in the guide surface.

The portions of the guide surface formed with the recesses are kept out of contact with the band member, and therefore the contact area between the band member and the guide surface is reduced. The dust or dirt attached to the inner side surface of the band member thus has a lesser effect, so that the band member slides smoothly. Also, the recesses function as a grease stay thereby to supply an appropriate amount of grease to the inner side surface of the band member.

According to a tenth aspect of the invention, there is provided a window regulator similar to those of the first to ninth aspects further comprising flexible brushes in contact with the band member at the ends of the guide surface along the direction in which the band member is in sliding contact.

provision of the brushes at the ends of the guide surface, with the brushes contacting and rubbing the inner side surface of the band member with the revolution of the band member, removes the dust and dirt attached on the inner side surface of the band member before the dust and dirt comes into contact with the guide surface. Dust and dirt are thus prevented from intruding onto the guide surface, with the result that the band member can always slide smoothly over the guide surface.

According to an eleventh aspect of the invention, there is provided a window regulator, wherein the surface of the brushes in contact with the band member can be sawtoothed in shape.

The sawtoothed surface of the brushes in contact with the band member has a sharp tip of each sawtooth thereof brought into contact with the inner side surface of the band member. Consequently, dust and dirt, even if firmly attached on the inner side surface of the band member, can be scraped off without fail, thereby preventing the intrusion of dust and dirt onto the guide surface.

The above and other objects, features and advantages of the present invention will become apparent from the following description and the appended claims, taken in conjunction with the accompanying drawings, in which preferred embodiments of the present invention are shown by way of illustrative example.

BRIEF DESCRIPTION OF THE DRAWINGS

The invention will now be described with reference to the accompanying drawings wherein.

DESCRIPTION OF THE PREFERRED EMBODIMENTS

Figure 1:
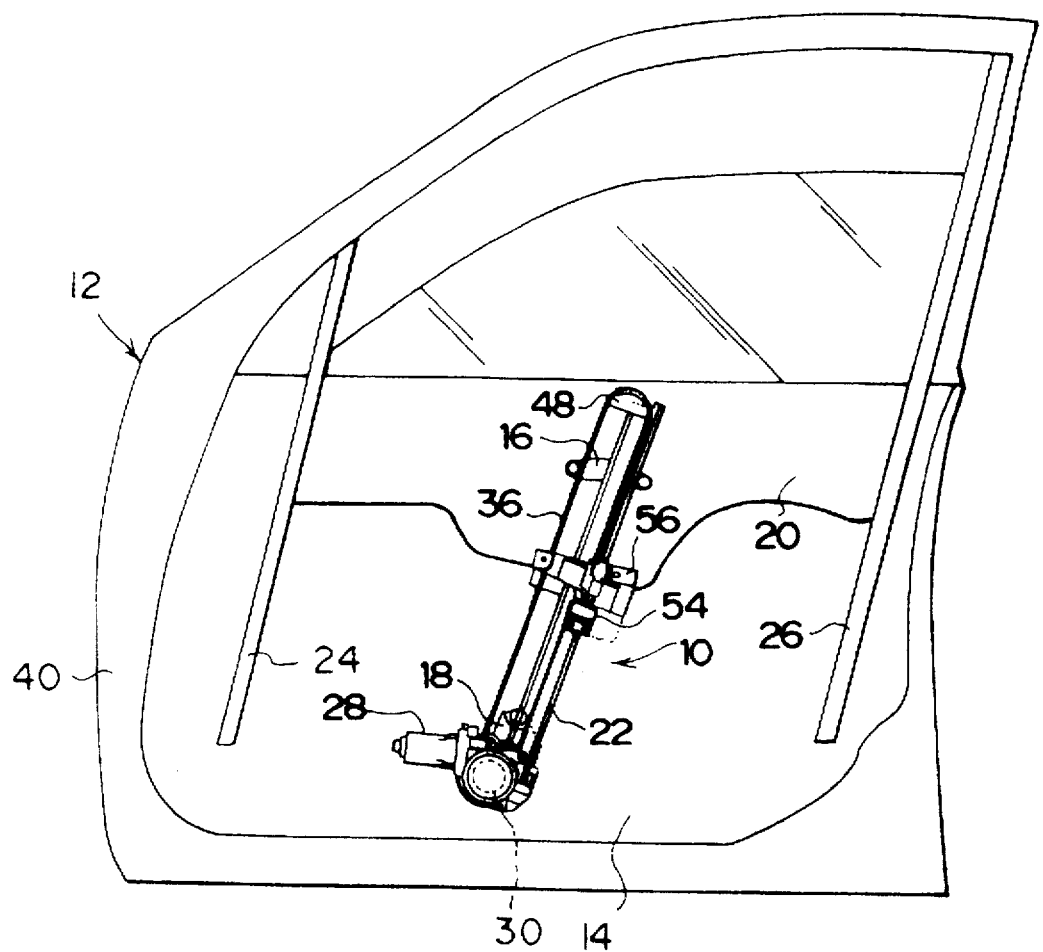
FIG. 1 is a broken-away front sectional view of a door on which a window regulator according to a first embodiment is installed, as taken along the width of the automotive vehicle.
Figure 2:
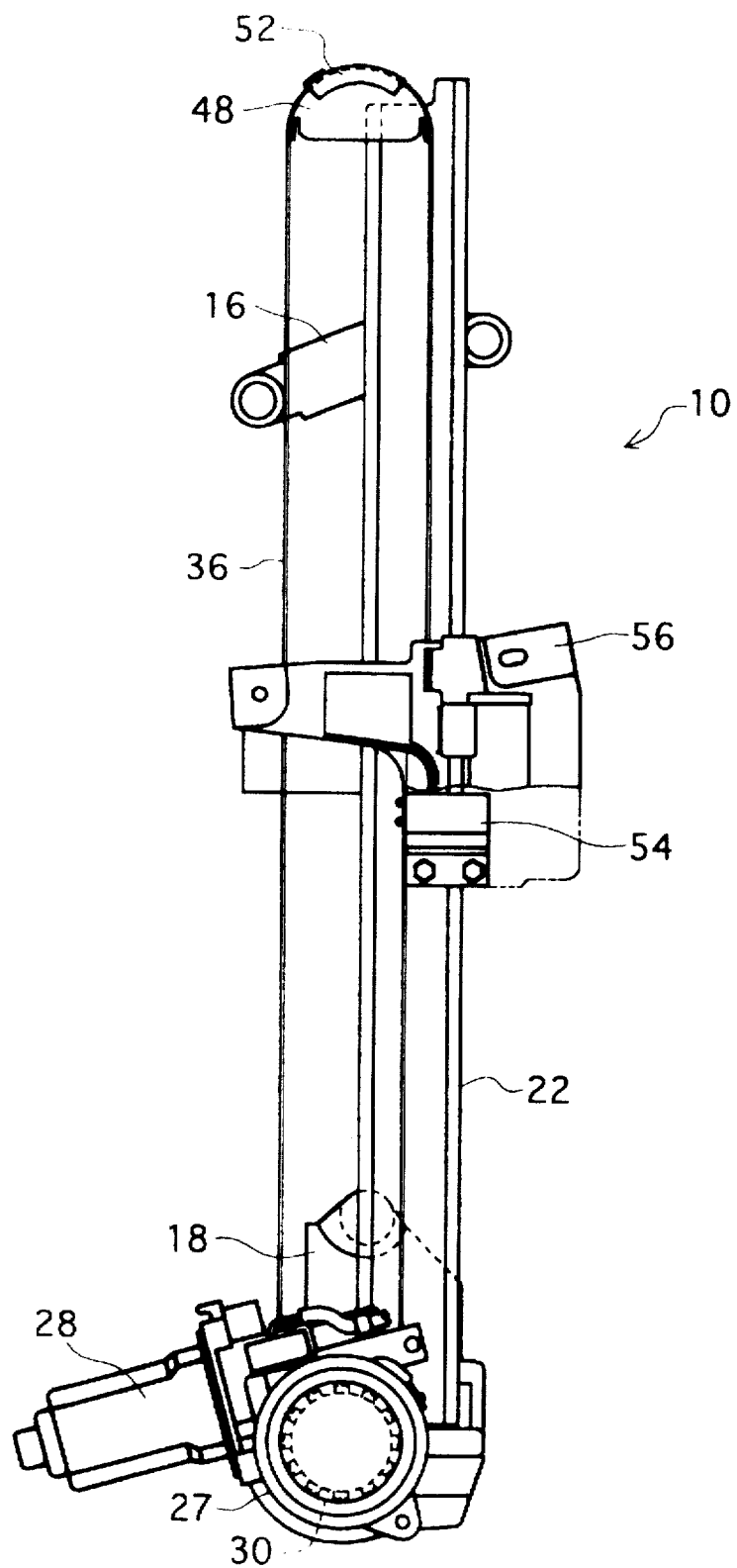
FIG. 2 is a front view of a window regulator according to the first embodiment as taken along the width of the vehicle.
Figure 3:
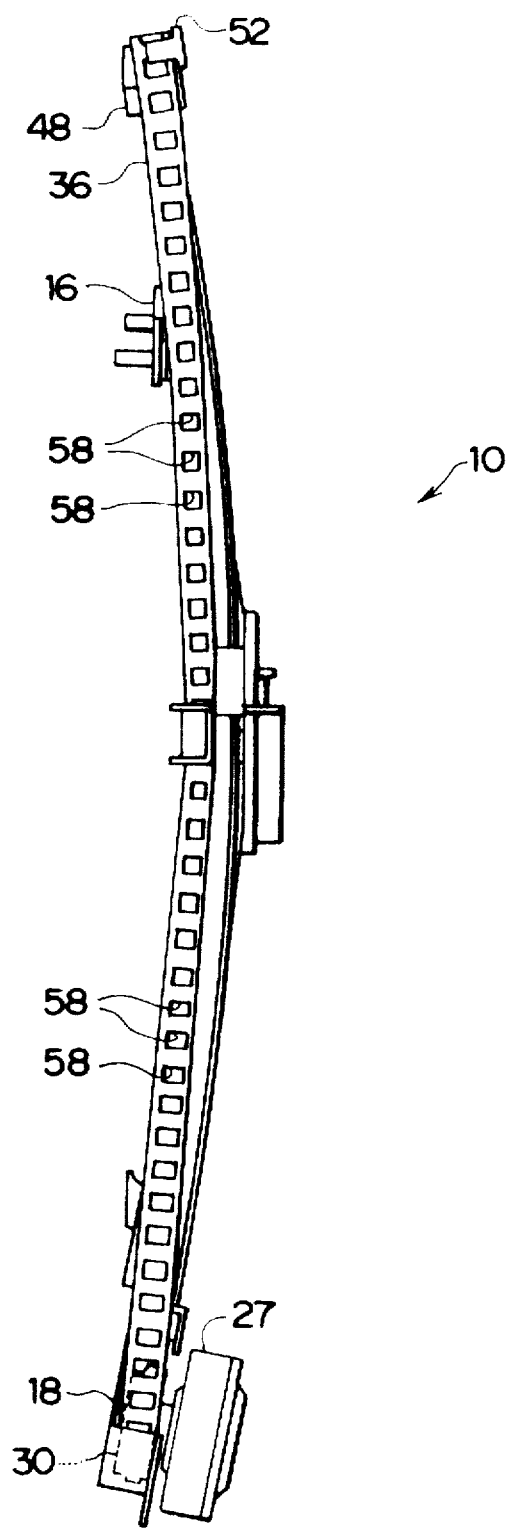
FIG. 3 is a side view of a window regulator according to the first embodiment, as taken from the rear end of the vehicle.

A window regulator 10 according to a first embodiment of the invention is shown in FIGS. 1 to 5. As shown in FIGS. 1 to 3, an inner panel 14 of a door 12 has mounted thereon an upper bracket 16 and a lower bracket 18 of the window regulator 10 in vertical arrangement. A guide rail 22 formed in a curve in conformity with the track of vertical movement of the window glass 20 is suspended between the upper bracket 16 and the lower bracket 18. The guide rail 22, as shown in FIG. 1, is arranged between a pair of guide frames 24, 26 arranged in opposed relation to each other and extending vertically along the door 12, so that the longitudinal direction of the guide rail 22 is substantially parallel to that of the guide frames 24, 26. The guide frames 24, 26 slidably support the window glass 20 at the ends thereof in the longitudinal direction of the vehicle.

As shown in FIG. 2, the lower bracket 18 arranged at a lower position has a motor 28 mounted thereon. A reduction gear disposed in a housing 27 is mounted on the driving shaft of the motor 28, and a sprocket 30 is adapted to rotate through the reduction gear.

Figure 4:
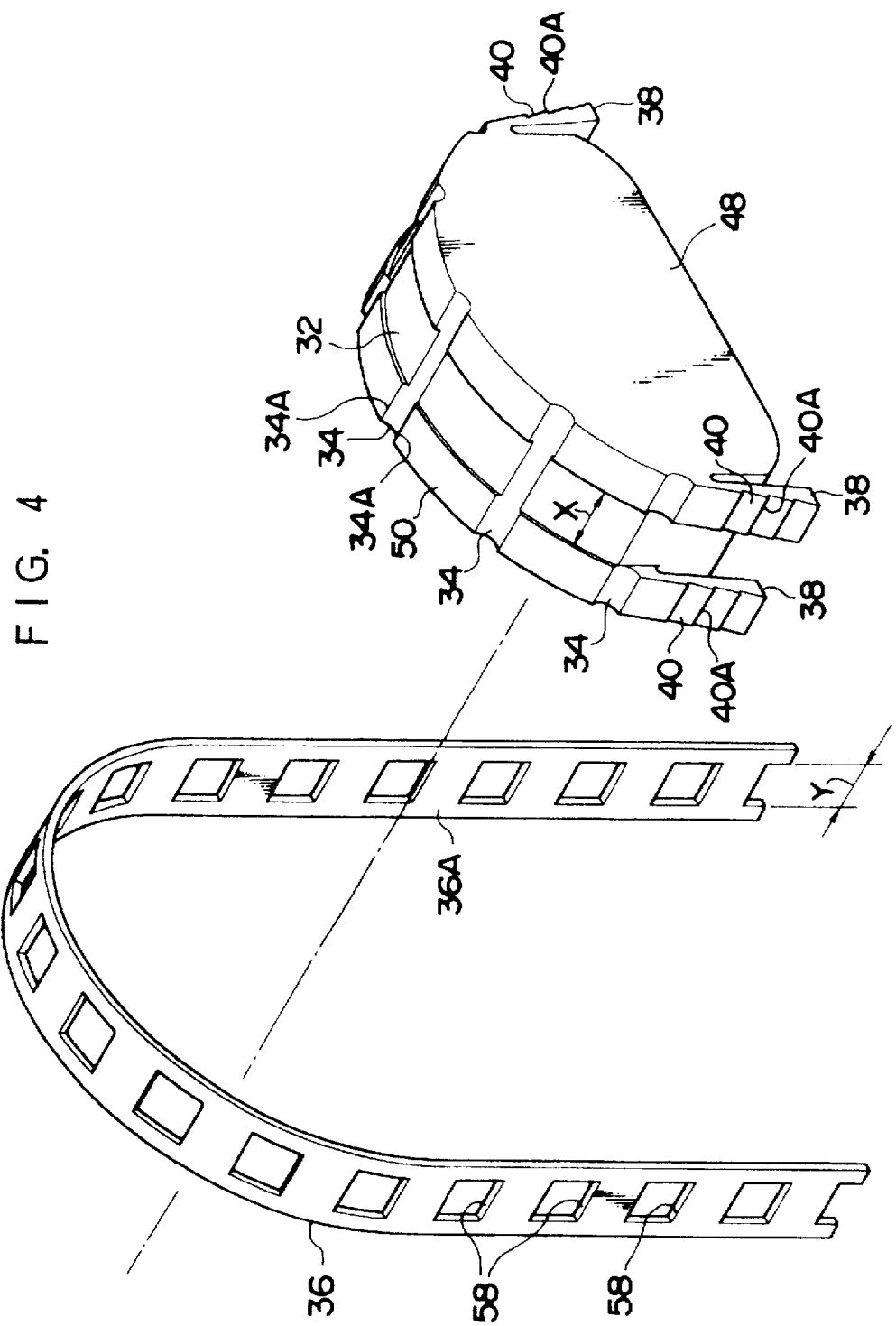
FIG. 4 is an exploded perspective view of a guide section of a window regulator according to the first embodiment.

It is seen from FIG. 4 that a guide member 48 in the shape of a substantially semicircular cylinder is mounted on the portion of the guide rail 22 upward of the upper bracket 16 with a guide surface 50, that is, an arcuate side, up. The guide member 48 constitutes a guide section of the window regulator 10. A cover 52 for covering the guide surface 50 sideways is arranged at the upper portion of the guide surface 50.

As shown in FIG. 2, a band member 36 formed in tape using an elastic material of resin is wound over the sprocket 30 and the guide member 48. The ends of the band member 36 are mounted on a slider 54 respectively, whereby the band member 36 is connected at the ends thereof into an annular form. The slider 54 has mounted thereon a carrier plate 56 for fixedly supporting the lower end of the window glass 20. The elastic material may preferably be made of such a material as polyester or nylon.

As shown in FIG. 3, the band member 36 has formed therein a plurality of rectangular engaging holes 58 at predetermined longitudinal constant intervals. Each of the engaging holes 58 is adapted to engage a corresponding one of the teeth of the sprocket 30 respectively. As a result, when the band member 36 rotates with the rotation of the sprocket 30, the sprocket 30 is prevented from slipping with the band member 36 or the band member 36 from being displaced in transverse direction.

Also, the band member 36 wound on the guide member 48 is so adapted as to rotate between the guide member 48 and the sprocket 30 while sliding in contact with the guide surface 50. In the process, the cover 52 prevents the band member 36 from being transversely displaced.

Figure 5:
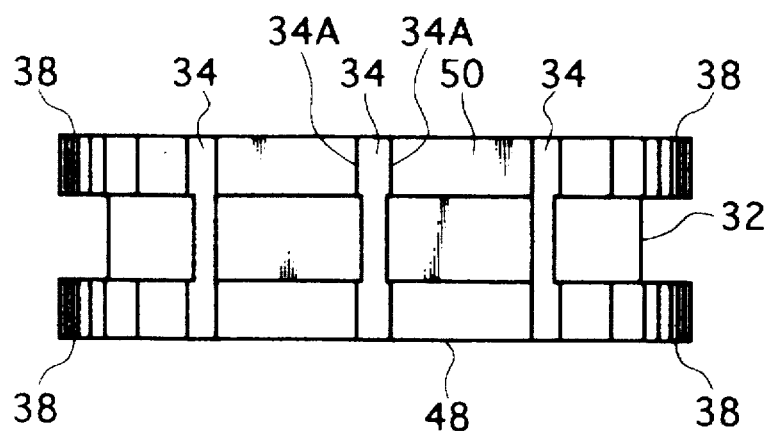
FIG. 5 is a plan view showing a guide member of a window regulator according to the first embodiment.
Figure 6:
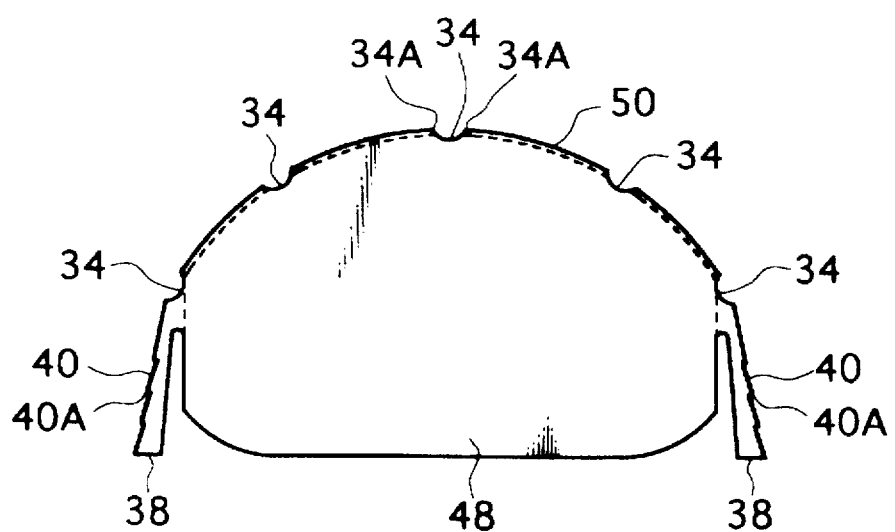
FIG. 6 is a front view showing a guide member of a window regulator according to the first embodiment.

The guide surface 50 has a central recess 32 formed along the direction in which the band member 36 slides, as shown in FIGS. 4 to 6. The width X of the recess 32 is larger than the width Y of the engaging holes 58 of the band member 36 (FIG. 4). The band member 36 is consequently brought into contact with the guide surface 50 only at the transverse ends thereof where the engaging holes 58 are not formed.

Also, the guide surface 50 of the guide member 48 has a plurality of lateral grooves 34 formed along the direction perpendicular to the direction in which the band member 36 slides. The junction between each of the lateral grooves 34 and the guide surface 50 constitutes a rectangular corner 34A, over which the inner side surface 36A of the band member 36 is adapted to scrape in its sliding motion. Grease is always retained in the lateral grooves 34 and is supplied to the inner side surface 36A of the band member 36 with the sliding motion of the band member 36.

Further, a pair of flexible brushes 38 are arranged at each of the ends of the guide surface 50 lacking the recess 32 along the direction in which the band member 36 slides. The surface of the brushes 38 opposed to the inner side surface 36A of the band member 36 is formed with sawteeth 40. The plural tips 40A of the sawteeth 40 are sharply formed in acute angles and are in contact with the inner side surface 36A of the band member 36.

Now, explanation will be made about the operation of the guide member 48 of the window regulator 10 according to this embodiment.

When a passenger depresses a switch not shown in an attempt to move the window regulator 20 vertically, the motor 28 is started. The rotational force of the motor 28 is transmitted to the sprocket 30 through the reduction gear, and the band member 36 wound on the sprocket 30 and the guide member 48 begins to rotate. With the movement of the carrier plate 56 coupled to the band member 36 through the slider 54, the window glass 20 fixedly supported on the carrier plate 56 moves vertically. For upward motion of the window glass 20, for example, the sprocket 30 is rotated counterclockwise (FIGS. 1 and 2).

The rotation of the band member 36 causes the inner side surface 36A of the band member 36 to slide on the guide surface 50 of the guide member 48 thereby to guide the band member 36. Even when dust or dirt are attached to the transverse ends of the inner side surface 36A of the band member 36, the rotation of the band member 36 first causes the tips 40A of the sawteeth 40 of the brushes 38 to successively come into contact with the transverse ends of the inner side surface 36A of the band member 36 to scrape off the dust and dirt therefrom. Therefore, the slidability is not adversely affected as dust and dirt cannot intrude between the guide surface 50 and the inner side surface 36A of the band member 36.

Dust and dirt may attach to the peripheral portions of the engaging holes 58 of the band member 36. Even in such a case, the recess 32 formed in the guide surface 50 allowing the band member 36 to contact the guide surface 50 only at the transverse ends thereof prevents the dust and dirt attached around the engaging holes 58 from intruding between the guide surface 50 and the inner side surface 36A of the band member 36. This fact, coupled with the fact that dust and dirt are scraped off by the brushes 38, further reduces the chance of slidability deterioration. Displacement, if any, of the band member 36 in the direction perpendicular to the sliding direction is limited within a predetermined extent by means of the cover 52. Also, since the width of the recess 32 is larger than that of the engaging holes 58, the band member 36 is in contact with the guide surface 50 only at the portions thereof lacking the engaging holes 58 as far as the displacement of the band member 36 is less than a predetermined amount.

The guide surface 50, on the other hand, has a plurality of lateral grooves 34 formed thereon, which act as what is called a grease stay. Hence, the sliding motion of the band member 36 causes an appropriate amount of grease to be supplied always from the lateral grooves 34 uniformly over the entire inner side surface 36A. The presence of the lateral grooves 34 thus causes the band member 36 to slide on the guide surface 50 even more smoothly.

A rectangular corner 34A is formed at the junction between each of the lateral grooves 34 and the guide surface 50. Should the brushes 38 fail to scrape off the dust and dirt sufficiently from the inner side surface of the band member 36, they are scraped off by the corner 34A, thereby preventing the slidability from deteriorating.

In the present embodiment, the sprocket 30 is rotated by the motor 28. However, the sprocket 30 may be rotated manually.

Also, the use of the fixed guide member 48, unlike a rotatable guide such as a pulley in the prior art, makes it possible to fabricate and mount the guide member 48 with low cost. Due to provision of the lateral grooves 34, the recess 32 and the brushes 38, the slidability of the band member 36 does not deteriorate as compared with the pulley.

Figure 7:
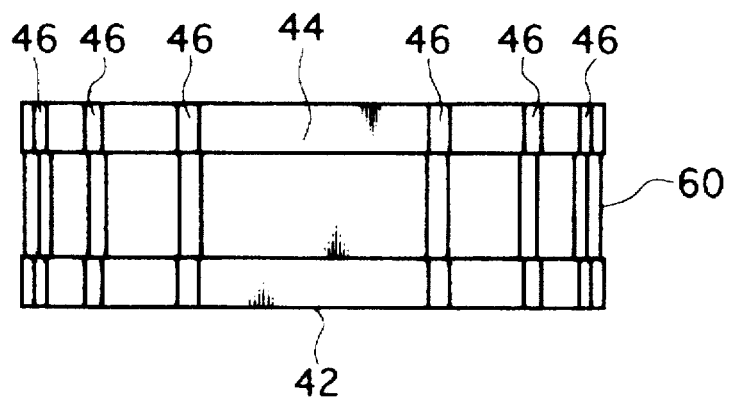
FIG. 7 is a plan view showing a guide member of a window regulator according to a second embodiment.
Figure 8:
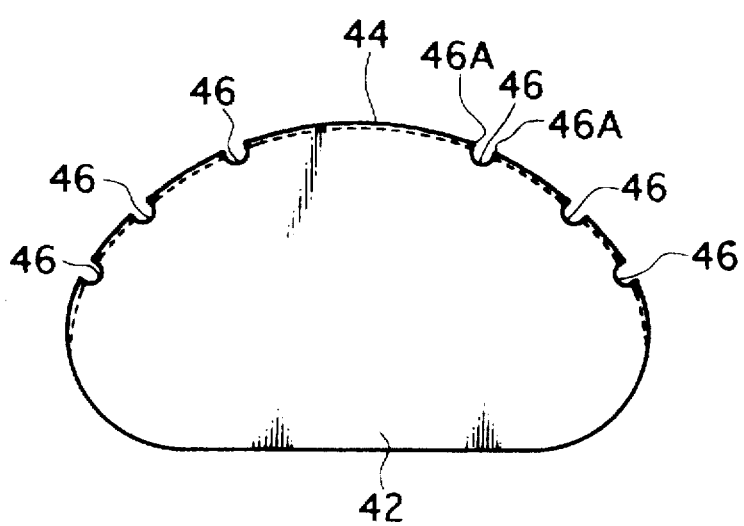
FIG. 8 is a front view showing a guide member of a window regulator according to the second embodiment.

FIGS. 7 and 8 show a guide member 42 of the window regulator according to a second embodiment of the invention.

This guide member 42, unlike the guide member 48 of the first embodiment, lacks the brushes 38 but is similar to the first embodiment in the remaining portions.

With this guide member 42, therefore, the lateral grooves 46 of the guide surface 44 function as a grease stay, so that the sliding motion of the band member 36 always supplies an appropriate amount of grease uniformly over the inner side surface 36A of the band member 36, thereby causing a smooth sliding motion of the band member 36.

Also, even when dust and dirt attach to the peripheral portions of the engaging holes 58 of the band member 36, the recess 60 formed in the guide surface 44 prevents the intrusion of dust and dirt between the guide surface 44 and the inner side surface 36A of the band member 36.

Dust and dirt, even if attached to the inner side surface 36A of the band member 36, are scraped off by the rectangular corners 46A formed at the junctions between the lateral grooves 46 and the guide surface 44, thereby preventing the slidability from being deteriorated.

Figure 9:
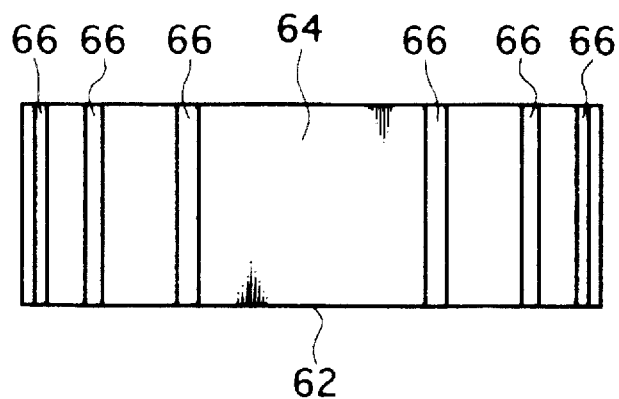
FIG. 9 is a plan view showing a guide member of a window regulator according to a third embodiment.
Figure 10:
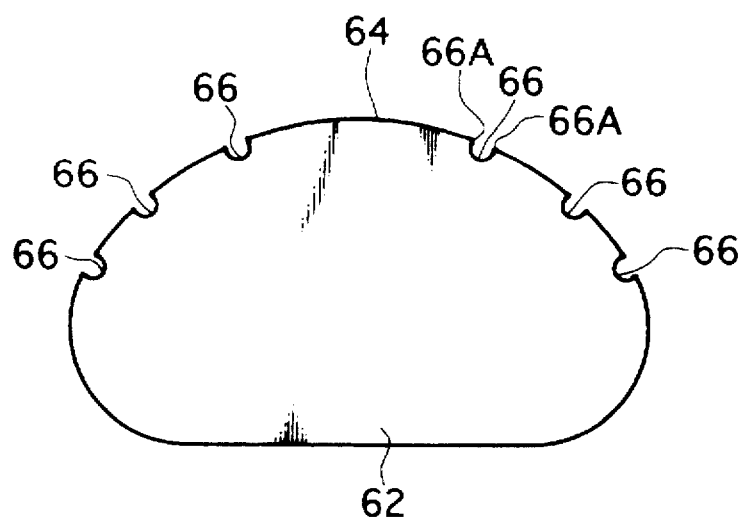
FIG. 10 is a front view showing a guide member of a window regulator according to the third embodiment.

FIGS. 9 and 10 shows a guide member 62 of a window regulator according to a third embodiment of the invention.

This guide member 62, unlike the guide member 48 of the first embodiment, lacks the brushes 38 and the recess 32 but is similar to the first embodiment in the remaining respects.

Also with the guide member 62, therefore, the lateral grooves 66 of the guide surface 64 function as a grease stay to always supply an appropriate amount of grease uniformly over the entire inner side surface 36A of the band member 36.

Dust and dirt which may attach to the inner side surface 36A of the band member 36 are scraped off by the corners 66A. The deterioration on slidability thus is prevented.

Figure 11:
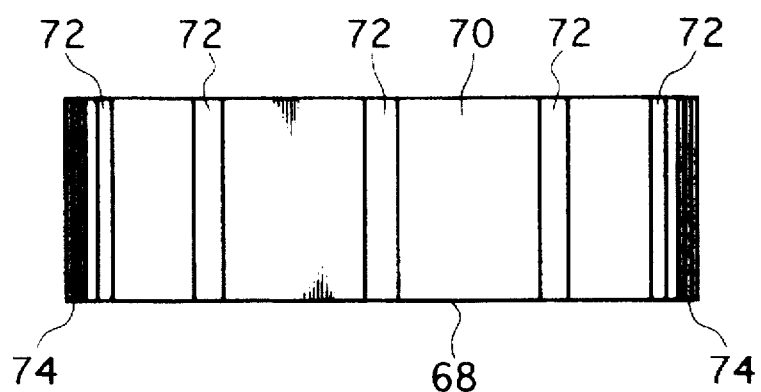
FIG. 11 is a plan view showing a guide member of a window regulator according to a fourth embodiment.
Figure 12:
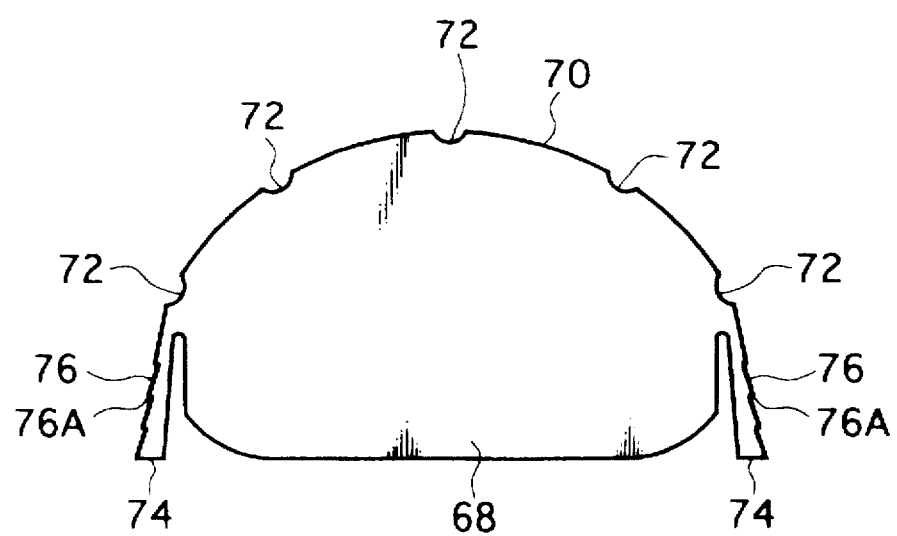
FIG. 12 is a front view showing a guide member of a window regulator according to the fourth embodiment.

FIGS. 11 and 12 show a guide member 68 of a window regulator according to a fourth embodiment of the invention.

This guide member 68, which is different from the guide member 48 of the first embodiment, is similar to the first embodiment with the exception that it lacks the recess 32.

Also with this guide member 68, therefore, dust and dirt which may attach to the inner side surface 36A of the band member 36 are scraped off by means of the tips 76A of the sawteeth 76 of the brushes 74, so that dust and dirt are kept off from the space between the guide surface 70 and the inner side surface 36A of the band member 36, and thus the slidability is not deteriorated.

Also, the plural lateral grooves 72 formed in the guide surface 70 function as a grease stay, whereby an appropriate amount of grease is always uniformly over the entire inner side surface 36A.

Figure 13:
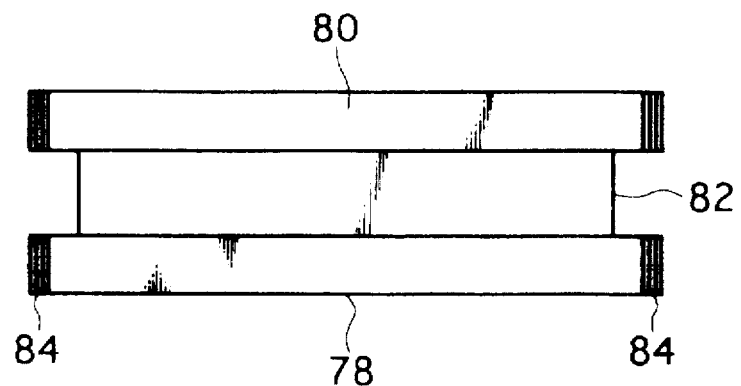
FIG. 13 is a plan view showing a guide member of a window regulator according to a fifth embodiment.
Figure 14:
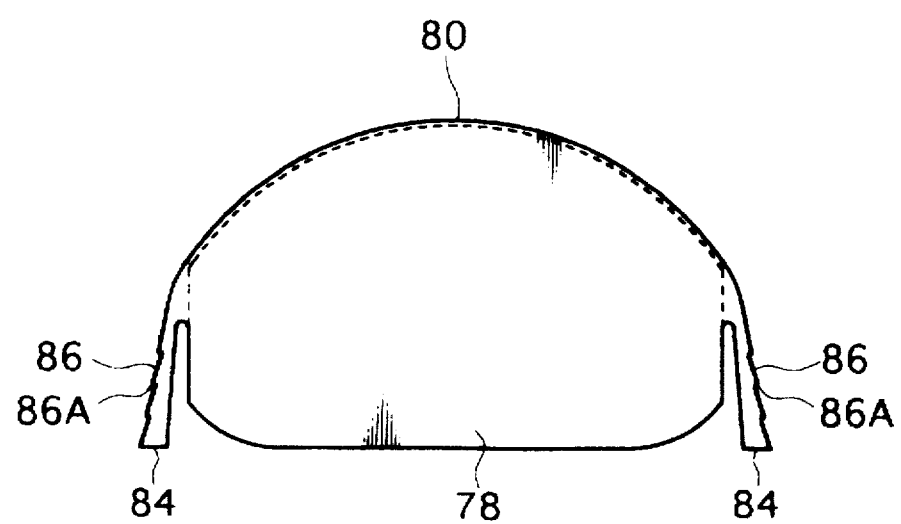
FIG. 14 is a front view showing a guide member of a window regulator according to the fifth embodiment.

FIGS. 13 and 14 show a guide member 78 of a window regulator according to a fifth embodiment of the invention.

This guide member 78, unlike the guide member 48 of the first embodiment, is not provided with the lateral grooves 34 and is similar to the first embodiment in the remaining portions.

Also in the case of this guide member 78, therefore, even if dust and dirt attach to the transverse ends of the inner side surface 36A of the band member 36, they are scraped off by means of the tips 86A of the sawteeth 86 of the brushes 84, so that dust and dirt are kept off from the space between the guide surface 80 and the inner side surface 36A of the band member 36, thereby preventing the slidability from being deteriorated.

Further, since the recess 82 is formed in the guide surface 80 and hence the band member 36 is in contact with the guide surface 80 only at the transverse ends thereof, dust and dirt, even if any are attached to the periphery of the engaging holes 58, fail to intrude between the guide surface 80 and the inner side surface 36A of the band member 36.

Figure 15:
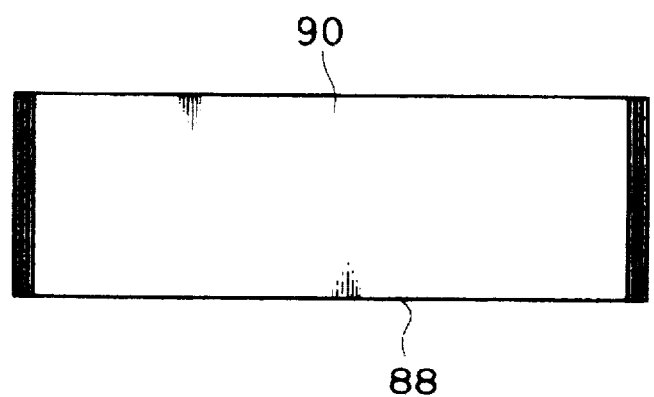
FIG. 15 is a plan view showing a guide member of a window regulator according to a sixth embodiment.
Figure 16:
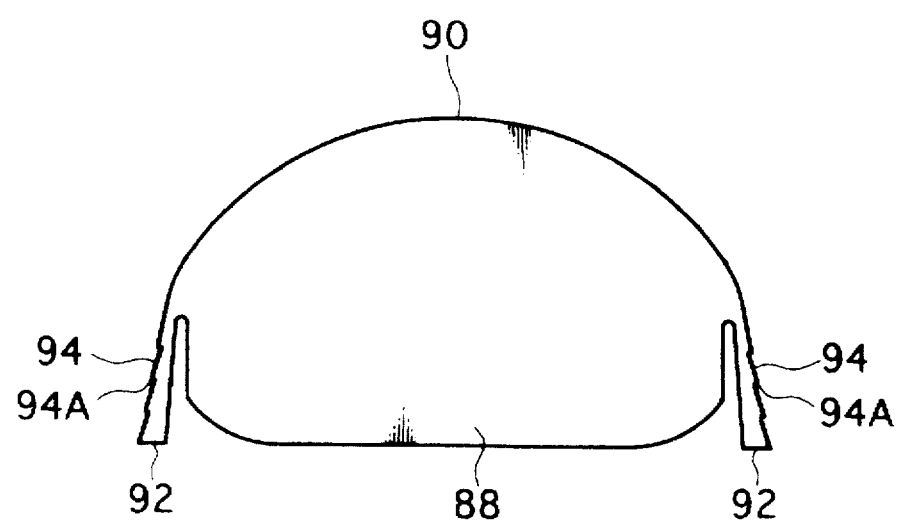
FIG. 16 is a front view showing a guide member of a window regulator according to the sixth embodiment.

FIGS. 15 and 16 show a guide member 88 of a window regulator according to a sixth embodiment of the invention.

This guide member 88, which is different from the guide member 48 of the first embodiment, is not provided with the lateral grooves 34 and the recess 32 but is similar to the first embodiment in the remaining points.

With this guide member 88 also, therefore, dust and dirt, if attached to the inner side surface 36A of the band member 36, are scraped off by the tips 94A of the sawteeth 94 of the brushes 92, and therefore dust and dirt cannot intrude between the guide surface 90 and the inner side surface 36A of the band member 36. The slidability thus is not adversely affected.

Figure 17:
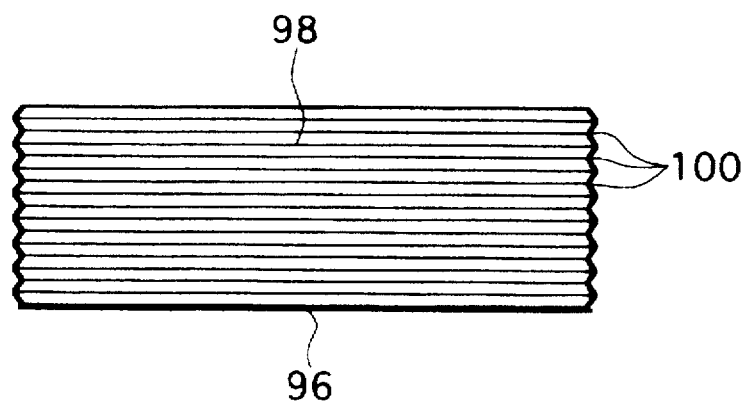
FIG. 17 is a plan view showing a guide member of a window regulator according to a seventh embodiment.
Figure 18:
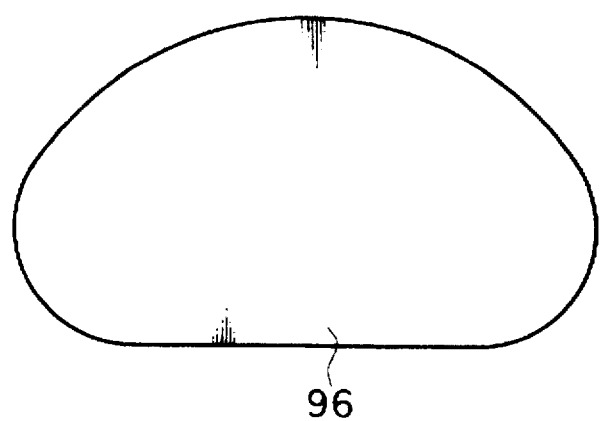
FIG. 18 is a front view showing a guide member of a window regulator according to the seventh embodiment.

FIGS. 17 and 18 show a guide member 96 of a window regulator according a seventh embodiment of the invention.

This guide member 96 is different from the guide member 48 of the first embodiment in that the guide member 96 has not the lateral grooves 34, the recess 32 and the brushes 38. With the exception that a plurality of longitudinal grooves 100 are formed in the guide surface 98 along the direction in which the band member 36 slides, this embodiment is similar to the first embodiment.

The longitudinal grooves 100 also function as a grease stay like the lateral grooves 34 of the first embodiment. More specifically, a certain amount of grease is always retained in the longitudinal grooves 100, which grease is supplied in an appropriate amount to the inner side surface 36A of the band member 36 by the sliding motion of the band member 36 along the guide surface 98. As a result, the band member 36 can slide always smoothly along the guide surface 98. Also, the longitudinal grooves 100 eliminate the dust and dirt from the inner side surface 36A of the band member 36, so that the dust and dirt are retained in the longitudinal grooves 100, thereby preventing the deterioration of slidability.

The inner side surface 36A of the band member 36 is in contact with the guide surface 98 only at the portions thereof not formed with the longitudinal grooves 100, i.e., the portions thereof between adjacent longitudinal grooves 100, while the portions formed with the longitudinal grooves 100 are not in contact with the inner side surface 36A of the band member 36. The result is a reduced contact area between the guide surface 98 and the inner side surface 36A of the band member 36. Consequently, should dust and dirt fail to be removed from the inner side surface 36A of the band member 36 by the longitudinal grooves 100, the effect of such dust and dirt is minimized to assure smooth sliding motion of the band member 36.

Figure 19:
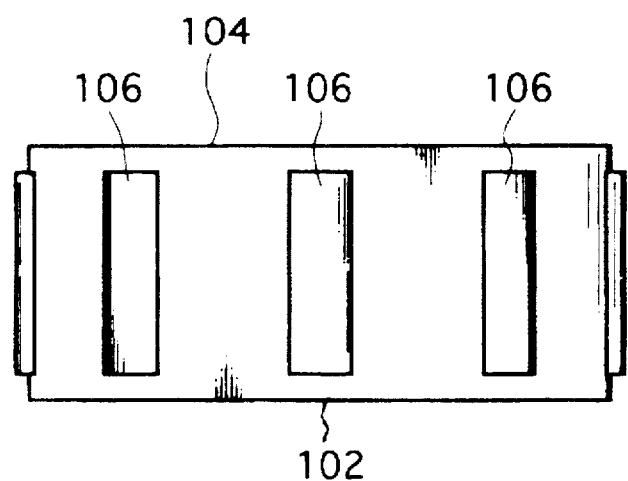
FIG. 19 is a plan view showing a guide member of a window regulator according to an eighth embodiment.
Figure 20:
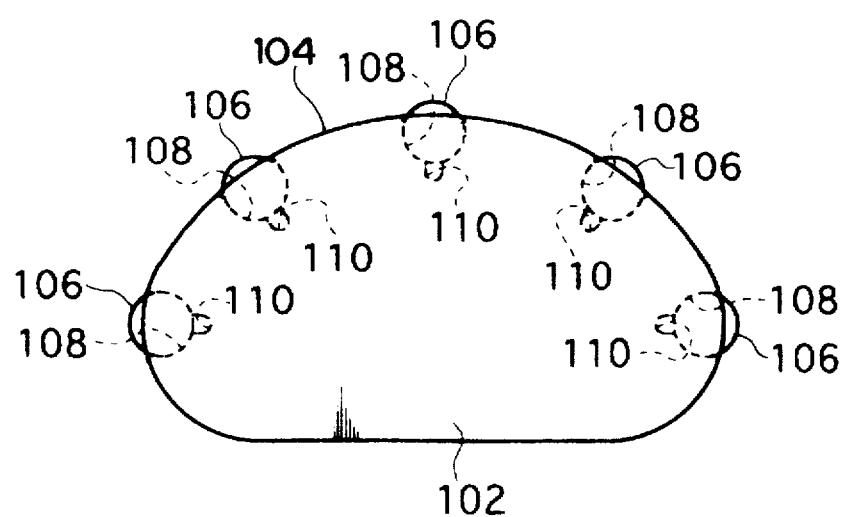
FIG. 20 is a front view showing a guide member of a window regulator according to the eighth embodiment.

FIGS. 19 and 20 show a guide member 102 of a window regulator according to an eighth embodiment of the invention.

This guide member 102, unlike the guide member 48 of the first embodiment, is not provided with the lateral grooves 34, the recess 32 and the brushes 38. Instead, a plurality of rollers 106 rotatable along the direction in which the band member 36 slides are arranged on the guide surface 104 in a form accommodated in recesses 108. The recesses 108 has a plurality of inner grooves 110 formed on the inner side thereof along the direction perpendicular to the direction in which the band member 36 slides.

The band member 36, which is not directly in contact with the guide surface 104, is guided by the rotation of the rollers 106 with which it is in contact. The band member 36, which is not in direct contact with the guide surface 104 in its sliding motion, thus is smoothly guided.

The inner grooves 110 formed in the recesses 108 function as a grease stay. More specifically, a predetermined amount of grease is always retained in the inner grooves 110, which grease is temporarily coated on the outer periphery of the rollers 106 and further on the inner side surface 36A of the band member 36. The inner side surface 36A of the band member 36 thus is always supplied with an appropriate amount of grease, resulting in the band member 36 being smoothly guided.

Figure 21:
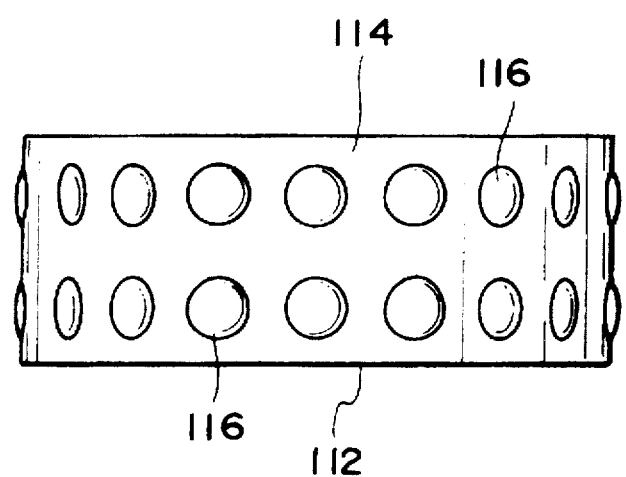
FIG. 21 is a plan view showing a guide member of a window regulator according to a ninth embodiment.
Figure 22:
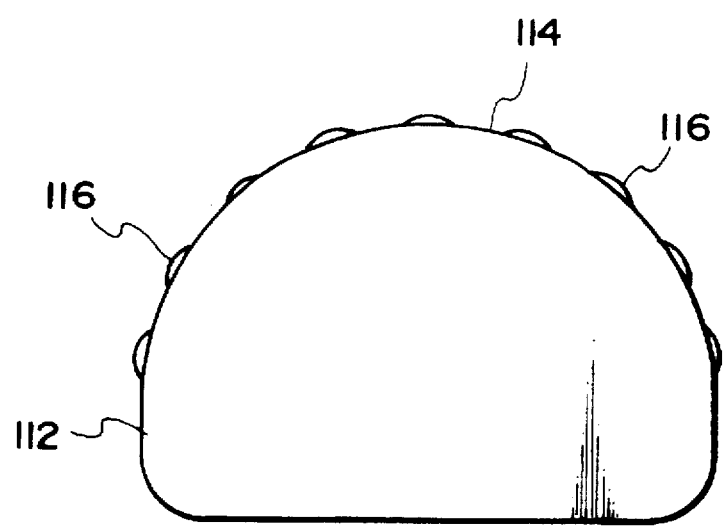
FIG. 22 is a front view showing a guide member of a window regulator according to the ninth embodiment.

FIGS. 21 and 22 show a guide member 112 of a window regulator according to a ninth embodiment of the invention.

This guide member 112, different from the guide member 48 of the first embodiment, is not provided with the lateral grooves 34, the recess 32 and the brushes 38, and has the guide surface 114 thereof formed with a plurality of (nine, in the case of FIGS. 21 and 22) spherical protrusions 116 equidistantly arranged in two lines along the direction in which the band member 36 slides. These protrusions 116 are slightly protruded from the guide surface 114.

The band member 36 is adapted to slide in contact with only the tip ends of the protrusions 116, while leaving a rectilinear trace of the protrusions 116 by the sliding motion thereof. In view of the resulting reduced contact area between the band member 36 and the guide surface 114, dust and dirt which may attach to the inner side surface of the band member 36 has a lesser effect. Hence, the slidability of the band member 36 is not deteriorated and smooth sliding motion of the band member 36 is assured. Also, the spherical shape of the protrusions 116 prevents the band member 36 in sliding motion from being caught by the protrusions 116.

Figure 23:
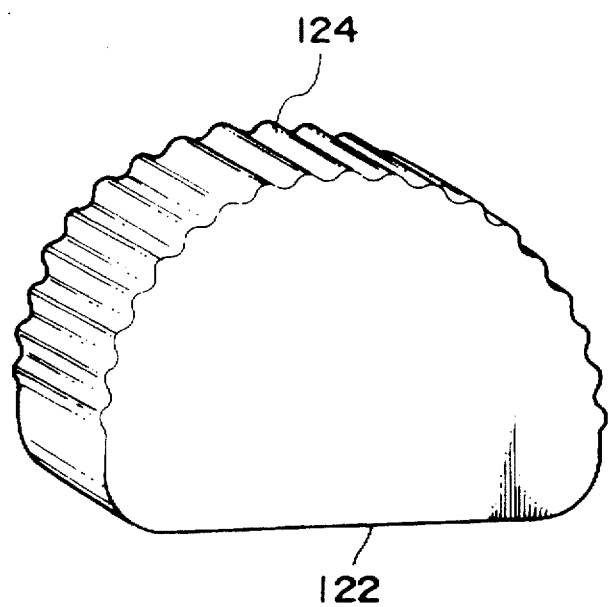
FIG. 23 is a perspective view showing a guide member of a window regulator according to a tenth embodiment.
Figure 24:
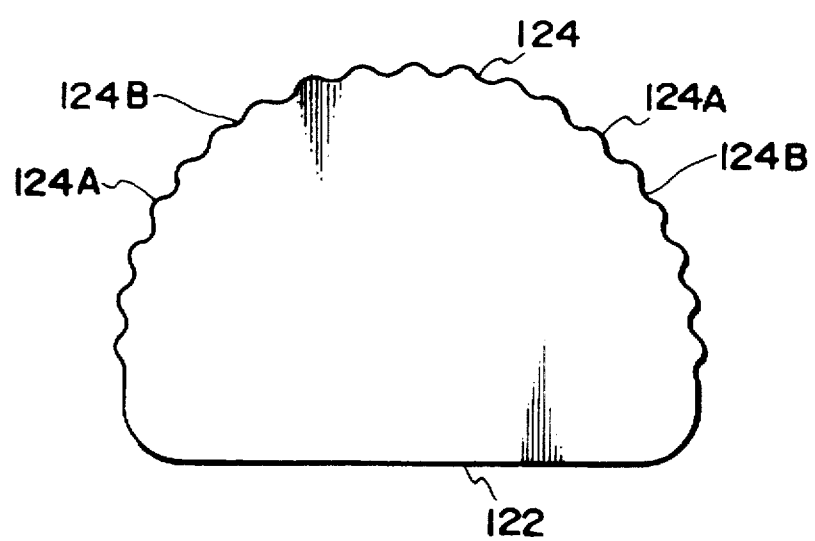
FIG. 24 is a front view showing a guide member of a window regulator according to the tenth embodiment.

FIGS. 23 and 24 show a guide member 122 of a window regulator according to a tenth embodiment of the invention.

This guide member 122, different from the guide member 48 of the first embodiment, is not provided with the lateral grooves 34, the recess 32 and the brushes 38, and has the guide surface 124 thereof formed in corrugation having a plurality of protrusions 124A and recesses 124B along the direction in which the band member 36 slides.

The band member 36 is adapted to slide in contact with the protrusions 124A of the corrugated guide surface 124, so that the contact area of the band member 36 is reduced to such an extent that the dust and dirt attached on the inner side surface of the band member 36 has a lesser adverse effect. Consequently, the slidability of the band member 36 is not deteriorated and smooth sliding motion thereof is assured. Further, the recesses 124B of the guide surface 124, which function as a grease stay, supply an appropriate amount of grease to the inner side surface of the band member 36 by the sliding motion of the band member 36.

Figure 25:
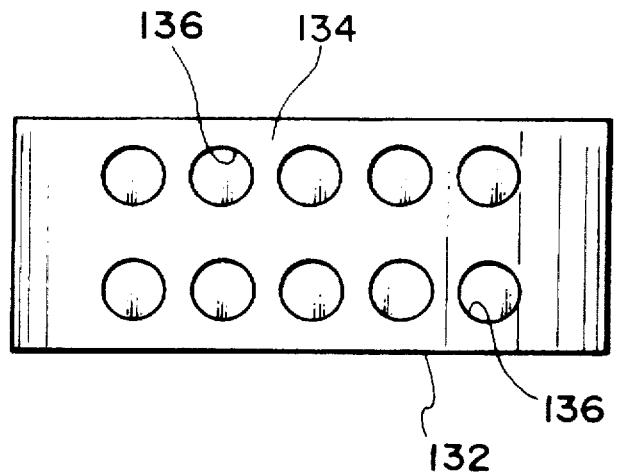
FIG. 25 is a plan view showing a guide member of a window regulator according to an eleventh embodiment.
Figure 26:
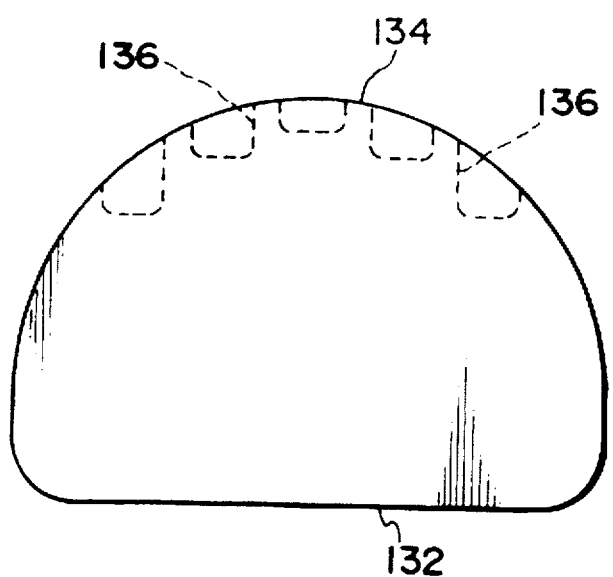
FIG. 26 is a front view showing a guide member of a window regulator according to the eleventh embodiment.
Figure 27:
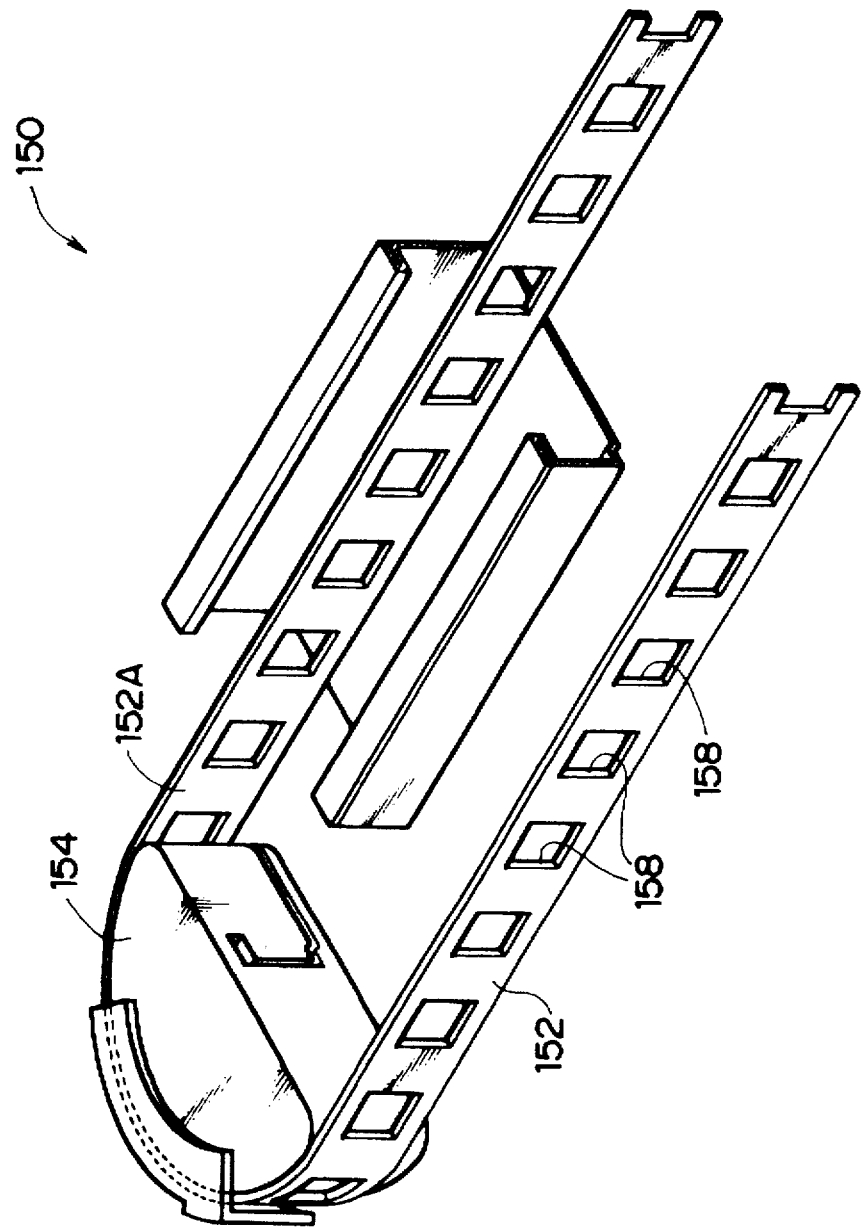
FIG. 27 is a perspective view showing a guide section of a conventional window regulator.
Figure 28:
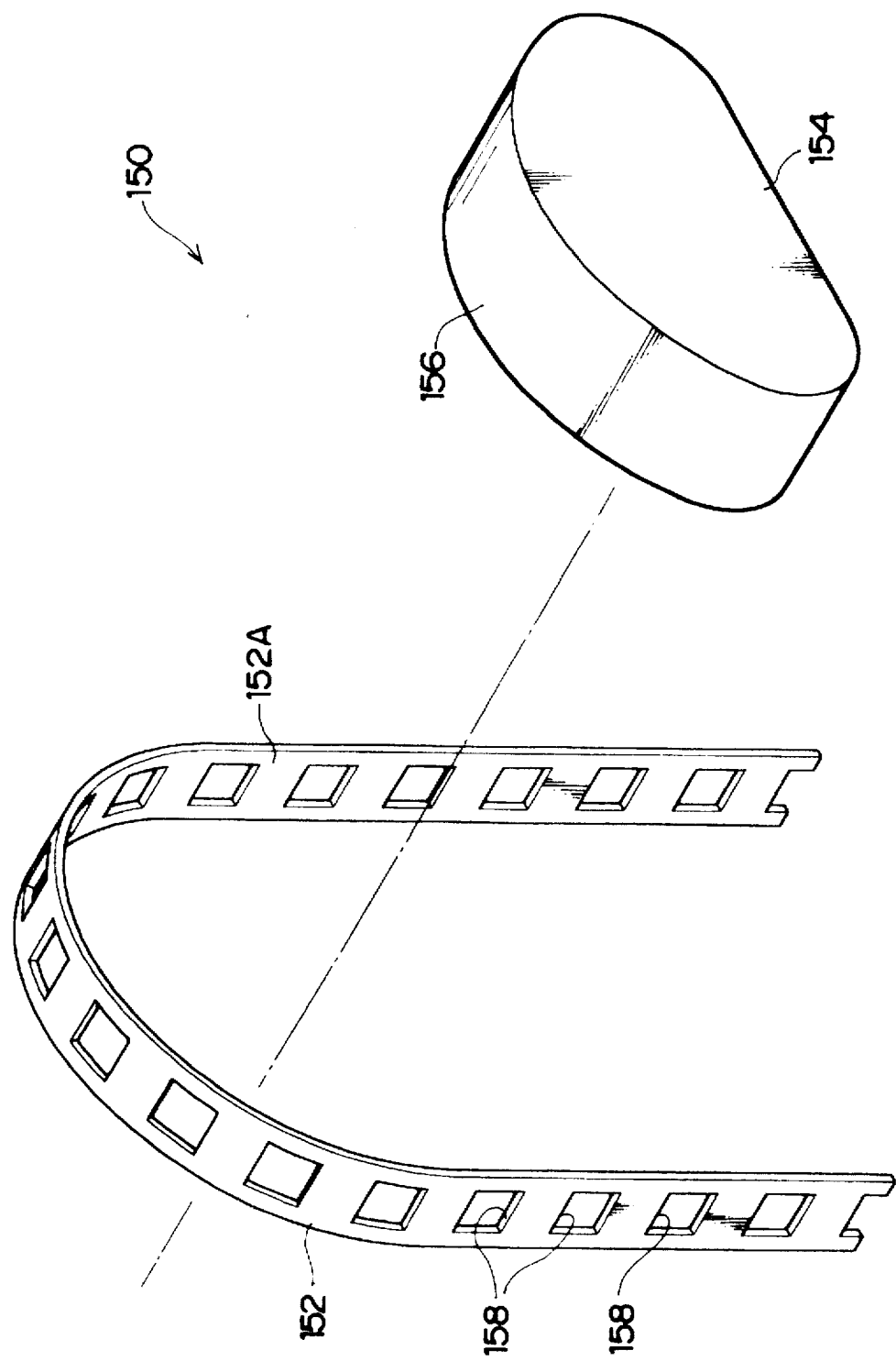
FIG. 28 is an exploded perspective view showing a guide section of a conventional window regulator.

FIGS. 25 and 26 show a guide member 132 of a window regulator according to an eleventh embodiment of the invention.

This guide member 132, different from the guide member 48 of the first embodiment, is not provided with the lateral grooves 34, the recess 32 and the brushes 38, and has the guide surface 134 thereof formed with a plurality of cylindrical recesses 136 along the direction in which the band member 36 slides.

This recesses 136 reduce the contact area between the band member 36 and the guide surface 134, and therefore dust and dirt, if attached on the inner side surface of the band member 36, has a reduced effect. For this reason, the band member 36 slides smoothly with the slidability thereof not adversely affected. Also, the recesses 136 act as a grease stay, from which an appropriate amount of grease is supplied to the inner side surface of the band member 36 with the sliding motion of the band member 36.

In addition to the embodiments described above, various modifications may be proposed. For example, the brushes 38 according to the first embodiment may be arranged at the ends of the guide surface of the guide member along the direction in which the band member 36 slides, while at the same time the longitudinal grooves 100 of the seventh embodiment are formed at the guide surface of the guide member. Therefore, the present invention of course is not confined to the above-mentioned embodiments, but is applicable with equal effect to various modifications thereof in accordance with the conditions of the location at which the window regulator is installed.

It will thus be understood from the foregoing description that according to the invention having the above-mentioned configuration, the slidability between the band member and the guide surface is not adversely affected.

While the embodiments of the present invention, as herein disclosed, constitute a preferred form, it is to be understood that other forms might be adopted.

What is claimed is:

1. A window regulator comprising:

a guide rail having two ends;

a guide member directly mounted at one end of the guide rail and having a guide surface with two ends;

a drive roller driven by a motor and mounted at another end of the guide rail; and an annular band member entrained over the guide member and attached to the drive roller to allow opening and closing of a window glass, having a plurality of engaging holes formed contiguously along a longitudinal direction of the annular band member, said longitudinal direction defining the direction in which the annular band member slides and parallel to a longitudinal direction of the guide rail, the guide surface having a plurality of lateral grooves which have transverse ends, placed along a direction crossing the direction in which the annular band member slides, and the guide member having a recess with a width larger than that of the engaging holes at a portion facing the engaging holes and along the direction in which the annular band member slides.

2. The window regulator according to claim 1, wherein a junction between each of the transverse ends of the lateral grooves and the guide surface constitutes a rectangular corner.

3. The window regulator according to claim 1, further comprising flexible brushes adapted to be in contact with the band member at the ends of the guide surface along the direction in which the band member slides.

4. The window regulator according to claim 3, wherein a surface of the brushes in contact with the band member is sawtoothed in shape.

5. A window regulator comprising:

a vertical guide rail having an upper end and a lower end for guiding a window glass from a closed position to an open position;

a fixed guide member directly mounted at the upper end of the vertical guide rail and having a fixed curved guide surface with two downwardly facing ends;

a drive roller driven by a motor and mounted at the lower end of the vertical guide rail;

an annular band member entrained over the curved guide surface and attached to the drive roller and to the window glass to allow opening and closing of the window glass in response to rotation of the drive roller, said annular band member having a plurality of engaging holes formed contiguously along a longitudinal direction of the annular band member for transmitting a driving force between the annular band member and the drive roller, said longitudinal direction defining the direction in which the annular band member slides over the curved guide surface and travels parallel to the guide rail and a plurality of saw-toothed protrusions formed on the curved guide surface for reducing the contact area between the annular band member and the curved guide surface, thereby improving the slidability between the band member and the guide member.

6. The window regulator according to claim 5, further comprising flexible brushes adapted to be in contact with the band member at the ends of the guide surface along the direction in which the band member slides.

7. The window regulator according to claim 6, wherein a surface of the brushes in contact with the band member is sawtoothed in shape.

8. A window regulator comprising:

a guide rail having two ends;

a guide member directly mounted at one end of the guide rail and having a guide surface with two ends;

a drive roller driven by a motor and mounted at another end of the guide rail; and an annular band member entrained over the guide member and attached to the drive roller to allow opening and closing of a window glass, having a plurality of engaging holes formed contiguously along a longitudinal direction of the annular band member, said longitudinal direction defining the direction in which the annular band member slides and parallel to a longitudinal direction of the guide rail, and the guide surface having a plurality of recesses, each said recess having a bottom portion with a groove and respective rollers, rotatable along the direction in which the band member slides, said rollers guiding the annular band member in contact therewith.

9. The window regulator according to claim 8, wherein said recesses are formed for accommodating the rollers embedded in the guide surface, and an inner groove is formed inside each of said recesses.

10. The window regulator according to claim 8, further comprising flexible brushes adapted to be in contact with the band member at the ends of the guide surface along the direction in which the band member slides.

11. The window regulator according to claim 10, wherein a surface of the brushes in contact with the band member is sawtoothed in shape.

12. A window regulator comprising:

a vertical guide rail having an upper end and a lower end for guiding a window glass from a closed position to an open position;

a fixed guide member directly mounted at the upper end of the vertical guide rail and having a fixed curved guide surface with two downwardly facing ends;

a drive roller driven by a motor and mounted at the lower end of the vertical guide rail;

an annular band member entrained over the curved guide surface and attached to the drive roller and to the window glass to allow opening and closing of the window glass in response to rotation of the drive roller, said annular band member having a plurality of engaging holes formed contiguously along a longitudinal direction of the annular band member for transmitting a driving force between the annular band member and the drive roller, said longitudinal direction defining the direction in which the annular band member slides over the curved guide surface and travels parallel to the guide rail; and a plurality of spherical protrusions formed on the curved guide surface for reducing the contact area between the annular band member and the curved guide surface, thereby improving the slidability between the band member and the guide member.

13. The window regulator according to claim 12, further comprising flexible brushes adapted to be in contact with the band member at the ends of the guide surface along the direction in which the band member slides.

14. A window regulator according to claim 13, wherein a surface of the brushes in contact with the band member is sawtoothed in shape.

15. A window regulator comprising:

a vertical guide rail having an upper end and a lower end for guiding a window glass from a closed position to an open position;

a fixed guide member directly mounted at the upper end of the vertical guide rail and having a fixed curved guide surface with two downwardly facing ends;

a drive roller driven by a motor and mounted at the lower end of the vertical guide rail;

an annular band member entrained over the curved guide surface and attached to the drive roller and to the window glass to allow opening and closing of the window glass in response to rotation of the drive roller, said annular band member having a plurality of engaging holes formed contiguously along a longitudinal direction of the annular band member for transmitting a driving force between the annular band member and the drive roller, said longitudinal direction defining the direction in which the annular band member slides over the curved guide surface and travels parallel to the guide rail; and a plurality of corrugated unevennesses formed on the curved guide surface for reducing the contact area between the annular band member and the curved guide surface, thereby improving the slidability between the band member and the guide member.

16. The window regulator according to claim 15, further comprising flexible brushes adapted to be in contact with the band member at the ends of the guide surface along the direction in which the band member slides.

17. The window regulator according to claim 16, wherein a surface of the brushes in contact with the band member is sawtoothed in shape.

18. A window regulator comprising:

a vertical guide rail having an upper end and a lower end for guiding a window glass from a closed position to an open position;

a fixed guide member directly mounted at the upper end of the vertical guide rail and having a fixed curved guide surface with two downwardly facing ends;

a drive roller driven by a motor and mounted at the lower end of the vertical guide rail;

an annular band member entrained over the curved guide surface and attached to the drive roller and to the window glass to allow opening and closing of the window glass in response to rotation of the drive roller, said annular band member having a plurality of engaging holes formed contiguously along a longitudinal direction of the annular band member for transmitting a driving force between the annular band member and the drive roller, said longitudinal direction defining the direction in which the annular band member slides over the curved guide surface and travels parallel to the guide rail; and a plurality of depressed portions formed on the curved guide surface for reducing the contact area between the annular band member and the curved guide surface, thereby improving the slidability between the band member and the guide member.

19. The window regulator according to claim 18, further comprising flexible brushes adapted to be in contact with the band member at the ends of the guide surface along the direction in which the band member slides.

20. The window regulator according to claim 19, wherein a surface of the brushes in contact with the band member is sawtoothed in shape.

21. A window regulator comprising: a vertical guide rail having an upper end and a lower end for guiding a window glass from a closed position to an open position; a fixed guide member directly mounted at the upper end of the vertical guide rail and having a fixed curved guide surface with two downwardly facing ends;

a drive roller driven by a motor and mounted at the lower end of the vertical guide rail;

an annular band member entrained over the curved guide surface and attached to the drive roller and to the window glass to allow opening and closing of the window glass in response to rotation of the drive roller, said annular band member having a plurality of engaging holes formed contiguously along a longitudinal direction of the annular band member for transmitting a driving force between the annular band member and the drive roller, said longitudinal direction defining the direction in which the annular band member slides over the curved guide surface and travels parallel to the guide rail; and a plurality of inverted V-shaped protrusions formed on the curved guide surface for reducing the contact area between the band member and the guide surface, thereby improving the slidability between the band member and the guide member.

22. The window regulator according to claim 21, further comprising a plurality of flexible brushes at the ends of the guide surface, adapted to be in contact with the band member along the direction in which the band member slides.

23. The window regulator according to claim 22, wherein the surface of the brushes in contact with the band member is sawtoothed in shape.

* * * * *